United States Patent [19]
Larson et al.

[11] Patent Number: 5,514,306
[45] Date of Patent: May 7, 1996

[54] PROCESS TO RECLAIM $UO_2$ SCRAP POWDER

[75] Inventors: Richard I. Larson; Thomas J. Flaherty, III; William R. Becker; Michael R. Chilton, all of Wilmington, N.C.

[73] Assignee: General Electric Company, San Jose, Calif.

[21] Appl. No.: 11,561

[22] Filed: Feb. 1, 1993

[51] Int. Cl.⁶ .................................................. G01C 21/00
[52] U.S. Cl. ............................ 264/0.5; 423/261; 252/643
[58] Field of Search ............................ 264/0.5; 423/261; 252/643

[56] References Cited

U.S. PATENT DOCUMENTS

| | | | |
|---|---|---|---|
| 4,035,468 | 7/1977 | Craigen et al. | 423/15 |
| 4,177,241 | 12/1979 | Divins et al. | 423/20 |
| 4,656,015 | 4/1987 | Divins et al. | 423/261 |
| 4,873,031 | 10/1989 | Yato et al. | 264/0.5 |
| 4,882,100 | 11/1989 | Yato et al. | 264/0.5 |
| 5,015,422 | 5/1991 | Yato et al. | 264/0.5 |
| 5,066,429 | 11/1991 | Larson et al. | 264/0.5 |
| 5,069,888 | 12/1991 | Larson et al. | 423/260 |

OTHER PUBLICATIONS

"The Influence of Precipitation Conditions on the Properties of Ammonium Diuranate and Uranium Oxide Powders," Janov et al., J. of Nucl. Mater, vol. 44 (1972), pp. 161–174.

*Primary Examiner*—Ngoclan Mai
*Attorney, Agent, or Firm*—James E. McGinness

[57] ABSTRACT

A process for reclaiming scrap $UO_2$ materials yields a high-sinter-density pellet. The scrap is oxidized in a high-temperature furnace to produce $U_3O_8$. The $U_3O_8$ particles from the oxidation furnace are reacted with nitric acid to produce a solution of uranyl nitrate that meets the concentration and free acid requirements of the ADU precipitation process. A controlled two-stage ADU precipitation process is carried out to produce ADU particles with a size and morphology that leads to high-surface-area $UO_2$ powder with excellent sintered pellet ceramic characteristics. After calcination and hydrogen reduction to $UO_2$, the high-surface-area $UO_2$ powder is passivated.

7 Claims, 4 Drawing Sheets

PROCESS TO RECLAIM UO₂ SCRAP POWDER

FIELD OF THE INVENTION

This invention relates generally to the manufacture of fissionable nuclear fuel comprising oxides of enriched uranium for use in nuclear reactors. In particular, the invention relates to a production process for reclaiming uranium dioxide scrap materials, such as sintered pellets, green pellets and calciner powder.

BACKGROUND OF THE INVENTION

Fissionable fuel grade uranium oxides for service in power generating nuclear reactors are commonly produced from uranium hexafluoride. A basic chemical procedure practiced in the industry for commercially carrying out the chemical conversion of uranium hexafluoride to uranium oxides for reactor fuel is commonly referred to in this art as a "wet" process. The process is "wet" in the sense that the conversion reactions are effected by or carried out within an aqueous medium or liquid phase with the reactants in solution and/or as a solid suspension therein. Typically, this so-called wet process comprises hydrolyzing uranium hexafluoride ($UF_6$) in liquid water to form the hydrolysis product uranyl fluoride ($UO_2F_2$), adding ammonium hydroxide to the uranyl fluoride to precipitate the uranyl fluoride as solid ammonium diuranate (($NH_4$)$_2U_2O_7$), then dewatering the solids and calcining in a reducing atmosphere to produce an oxide of uranium (e.g., $UO_2$). This version of the wet process is frequently referred to as the "ADU" procedure since it normally entails the formation of ammonium diuranate.

The uranium oxides commercially produced by such conventional methods comprise a fine relatively porous powder which is not suitable as such for use as fuel in a nuclear reactor. Typically, it is not a free-flowing, relatively uniform-sized powder, but rather clumps and agglomerates of particles of varying sizes, making it unsuitable to uniformly pack into units of an apt and consistent density. These uranium oxide powders often have very high particle surface areas.

Thus, the raw uranium oxide product derived from the chemical conversion is normally processed through conventional powder refining procedures, such as milling and particle classification, to provide an appropriate sizing of the powders. Such processing frequently includes blending of uranium oxide powders of different particle sizes or ranges and from different sources. Commonly the powdered uranium oxides are handled and conveyed through such processing operations by pneumatic means. Thus, the uranium oxides can be subjected to extensive exposure to air, and in turn, oxygen.

Aptly processed uranium oxide powders are press molded into "green" or unfired pellets which are subsequently sintered to fuse the discrete powder particles thereof into an integrated body having a unit density of 95 to 97% of theoretical ("TD") for the oxide of uranium, and suitable for utilization in the fuel system of a nuclear reactor.

Uranium dioxide is an exception to the law of definite proportions since "$UO_2$" actually denotes a single, stable phase that may vary in composition from $UO_{1.7}$ to $UO_{2.25}$. The thermal conductivity of uranium oxide decreases with increasing oxygen-to-uranium (O/U) ratios. Thus, uranium dioxide having as low an O/U ratio as practical is preferred for use as fuel in nuclear reactors to enable the most efficient passage of heat generated within fissioning fuel material outward to an external heat transfer medium. However, since uranium dioxide powder oxidizes readily in air and absorbs moisture, the O/U ratio of the powder tends to increase significantly to an excess of that acceptable for use as nuclear fuel for effective operation of a nuclear reactor.

During the foregoing chemical conversion process, $UO_2$ scrap materials, such as sintered pellets, green pellets and calciner powder, are produced. These materials are conventionally recycled. Usually, scrap $UO_2$ materials from the production facility are oxidized in a high-temperature furnace to produce $U_3O_8$ and then the $U_3O_8$ is reacted with nitric acid to produce uranyl nitrate solutions. Uranium can be precipitated from these solutions with ammonium hydroxide to produce ADU. The ADU precipitate may or may not be dried, before processing through the calciner in a hydrogen reducing environment to produce $UO_2$ powder.

Usually this $UO_2$ powder has a low sinter density, less than 10.60 gm/cm³ or 96.6% TD, as shown in FIG. 7 of an article entitled "The Influence of Precipitation Conditions on the Properties of Ammonium Diuranate and Uranium Dioxide Powders" by J. Janov et al., Journal of Nuclear Materials, Vol. 44, pp. 161–174 (1972). Other sintered pellet characteristics include high open porosity, nonuniform microstructure, with poor production yields, that is, radial cracks, end flakes, etc. Janov et al. attributed this to the large agglomerates formed during the ADU precipitation step.

In particular, Janov et al. found that the pH at which precipitation occurred was the most important parameter in determining the size of ADU agglomerates and the settling rate and filterability of the slurry. In two-stage precipitation, the ADU properties were determined by the proportion of uranium precipitated at different pH values.

Specifically, Janov et al. reported that the physical nature of ADU, as well as its chemical composition, changes with pH of precipitation. The sizes of ADU crystallites and agglomerates both decrease with increasing pH of precipitation, resulting in a decrease in the filterability and settling rate of ADU slurries. The most filterable ADU was produced at pH 3.5, where a plateau exists in the uranyl nitrate-ammonium hydroxide titration curve. The ADU is partly soluble in this region and large crystallites and agglomerates are formed. However, all the uranium is not recovered from solution as ADU until pH 6–7 is reached.

Janov et al. found that the size of $UO_2$ agglomerates was determined by the manner in which the parent ADU had been precipitated. Reduction at about 600° C. chemically converted the ADU to $UO_2$ and caused changes in crystallite size, but the agglomerates remained essentially intact. The size of the $UO_2$ agglomerates was governed primarily by precipitation conditions. In turn, the size of agglomerates in the $UO_2$ powder was found to be a more important parameter than surface area in determining powder sinterability. There was no general correlation between the $UO_2$ surface area and the sintered density of the $UO_2$ pellets.

Janov et al. further concluded that the greater the amount of uranium precipitated at pH 3.5, the greater was the proportion of large agglomerates in the ADU and the ensuing $UO_2$ powder. As the percentage uranium precipitated at pH 3.5 increased above 75%, the sintered density achieved with $UO_2$ powders derived from the ADU decreased rapidly. The large agglomerates present in poorly sinterable $UO_2$ powder affected the microstructure of the sintered pellets. Pellets fabricated from $UO_2$ containing only small agglomerates have much smaller grains and generally a denser pellet with uniform microstructure is obtained. Powders containing large agglomerates gave sintered pellets with low densities and non-uniform microstructures.

SUMMARY OF THE INVENTION

The present invention is an improved production process to reclaim $UO_2$ scrap materials, such as sintered pellets, green pellets, and calciner powder. The $UO_2$ powder obtained from this process has excellent ceramic characteristics that exceed the parent material, yielding sintered pellets with an extremely high sinter density, few defects, such as end flakes, radial cracks, etc., and low open porosity. The range of sinter density found in production is 98.5 to 99.5% TD or 10.80 to 10.92 gm/cm$^3$, while the open porosity has a range of 0.000 to 0.023%.

The scrap $UO_2$ materials fed to this process contain very small quantities of other metallic impurities, thereby eliminating the need for purification of the uranyl nitrate solution by solvent extraction. The scrap is oxidized in a high-temperature furnace to produce $U_3O_8$. Following scrap oxidation, the process in accordance with the invention produces $UO_2$ powder with unique ceramic properties. The critical steps of this process are as follows: (1) the chemical reaction of solid $U_3O_8$ and nitric acid is controlled to produce a solution of uranyl nitrate that meets the concentration and free acid requirements of the ADU precipitation process; (2) the two-stage ADU precipitation process is controlled to produce ADU particles with a size and morphology that leads to high-surface-area $UO_2$ powder with excellent sintered pellet ceramic characteristics; and (3) after calcination and hydrogen reduction to $UO_2$, the high-surface-area $UO_2$ powder is passivated.

The process of the invention eliminates the poor ceramic characteristics of the final sintered pellet. The powder produced can be sintered to a high density, low open porosity, and uniform microstructure with few defects.

DETAILED DESCRIPTION OF THE PREFERRED EMBODIMENT

Figure 1:
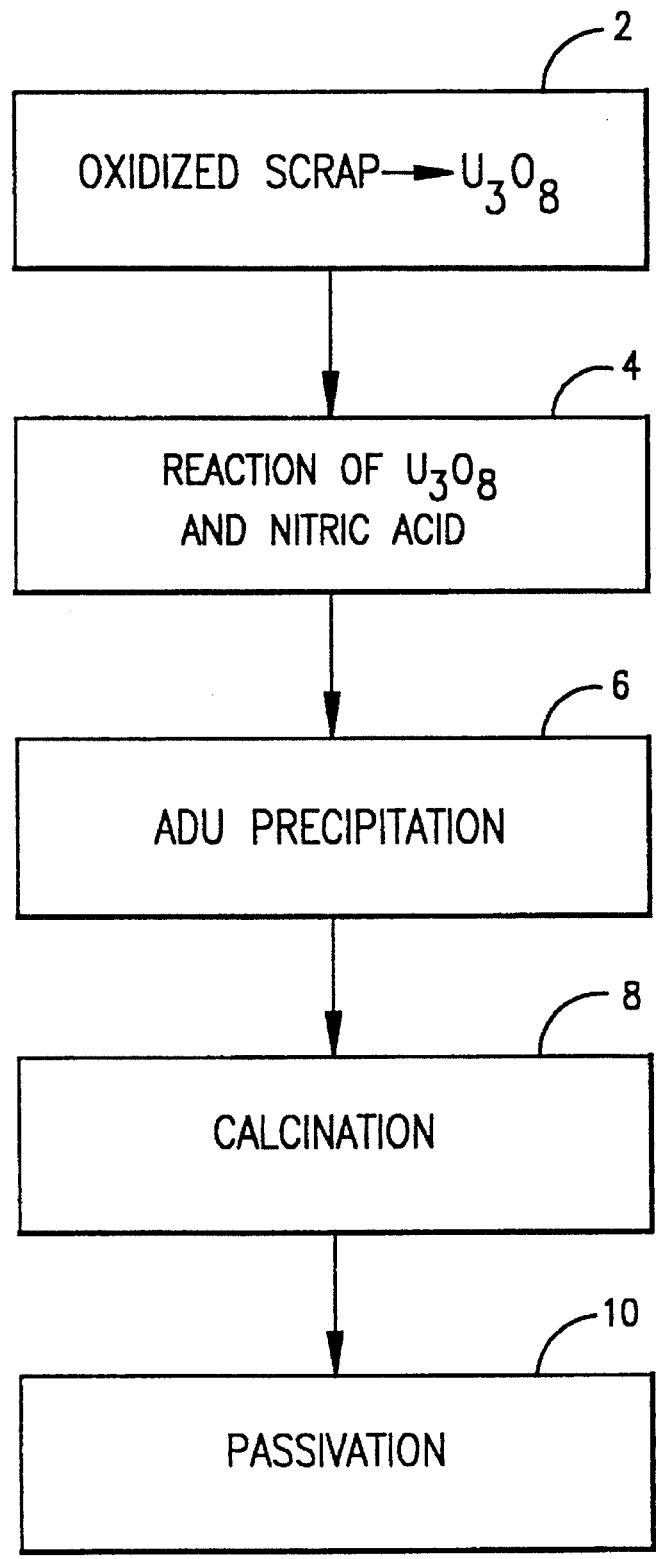
FIG. 1 is a flow diagram showing the sequence of steps in accordance with the preferred embodiment of the process of the invention.

A process flow diagram for reclaiming $UO_2$ scrap in accordance with the preferred embodiment of the invention is shown in FIG. 1. The $UO_2$ scrap is oxidized to form $U_3O_8$ (step 2) by the reaction:

$$3UO_2 + O_2 \rightarrow U_3O_8$$

The $U_3O_8$ particles from the oxidation furnace are reacted with nitric acid ($HNO_3$) to produce a solution of uranyl nitrate (step 4) accompanied by the emission of $NO_x$ gases according to the formula:

$$U_3O_8 + 8HNO_3 \rightarrow 3UO_2(NO_3)_2 + 2NO_2 + 4H_2O$$

The uranyl nitrate solution is then fed to a two-stage precipitation process (step 6), and reacted with ammonium hydroxide to form a concentrated slurry of ADU particles.

The precipitation of ADU from a uranyl nitrate solution yields Type II ADU, which has the following formula as determined by X-ray diffraction:

$$3UO_2 \cdot NH_3 \cdot 5H_2O \text{ or } 3UO_2(OH)_2 \cdot NH_3 \cdot 2H_2O$$

Thus, the ADU precipitation reaction can be written as:

$$3UO_2(NO_3)_2 + 6NH_4OH + 2H_2O \rightarrow 3UO_2(OH)_2 \cdot NH_3 \cdot 2H_2O + 5NH_4NO_3 + HNO_3$$

although during the first-stage precipitation step, Type I ADU, which is uranyl hydroxide, $UO_2(OH)_2$, probably also forms.

The ADU slurry is centrifuged to remove ammoniated water and then calcined. Calcination (step 8 in FIG. 1) eliminates residual water and ammonia, producing uranium oxide ($U_3O_8$). The $U_3O_8$ is reduced in a hydrogen atmosphere at high temperature, i.e., at temperatures above 400° C., to form $UO_2$ powder. Finally, the reactive powder is passivated (step 10) to prevent burning or excessive oxidation during the remainder of powder preparation and pressing operations.

The precipitation process is carried out in two stages. The first stage involves ammonia precipitation of no more than 65 wt. % of the uranium as ADU (with a measuring accuracy of ±2 wt. %). The resulting slurry of ADU particles flows to a process holding tank to ensure 65% precipitation or less. The second stage completes the ADU precipitation process at a solution pH of 7.3.

During the first stage the ammonia flow is controlled so that 65%±2% of the uranium precipitates as ADU and any free acid (N) is neutralized. The concentration of uranyl nitrate and free acid in the feed to the first precipitation stage is accurately measured using micropipettes, prior to adding ammonia to the solution. A computer algorithm was developed on the basis of this ammonium hydroxide and uranyl nitrate reaction to determine the amount of the ammonia addition. The computer algorithm for the precipitation of ADU is as follows:

Uranyl Nitrate Flow (UNH)=14.59 (R/$C_u$)

Ammonia Flow ($NH_3$)=(UNH)(2$C_u$P/238+N)

Water Flow=($NH_3$)($M_2/M_1$−1)

where R is the rate of $UO_2$ (kg/hr); $C_u$ is the uranium concentration (gm U/liter); N is the nitric acid molarity; P is the fraction of uranium precipitated in the first precipitator; and $M_1$, $M_2$ are the dilute and concentrated $NH_3$ molarities, respectively.

With the above measurements as input to the algorithm, the exact amount of ammonium hydroxide can be determined that will precipitate 65% of the uranium to within an accuracy of ±2%. If the percent ADU precipitated is greater than 67%, the excellent ceramic properties of the sintered pellets are not achieved, that is, a lower sinter density in the final sintered pellets, less than 97.5% TD, is observed and more surface defects, such as end flakes, radial cracks, etc. are found.

The large ADU agglomerates described in the above-discussed Janov et al. article are not observed in the microstructure or in the ADU particle size measurements. This can be attributed to the precipitation process of the invention.

The precipitation process requires the uranyl nitrate feed solution to have a uranium concentration of 180 to 240 gm U/liter, and a free acid concentration that is less than 1 mole/liter. To meet these requirements, the nitric acid—

$U_3O_8$ reaction that produces uranyl nitrate is carried out under specific conditions.

Figure 2:
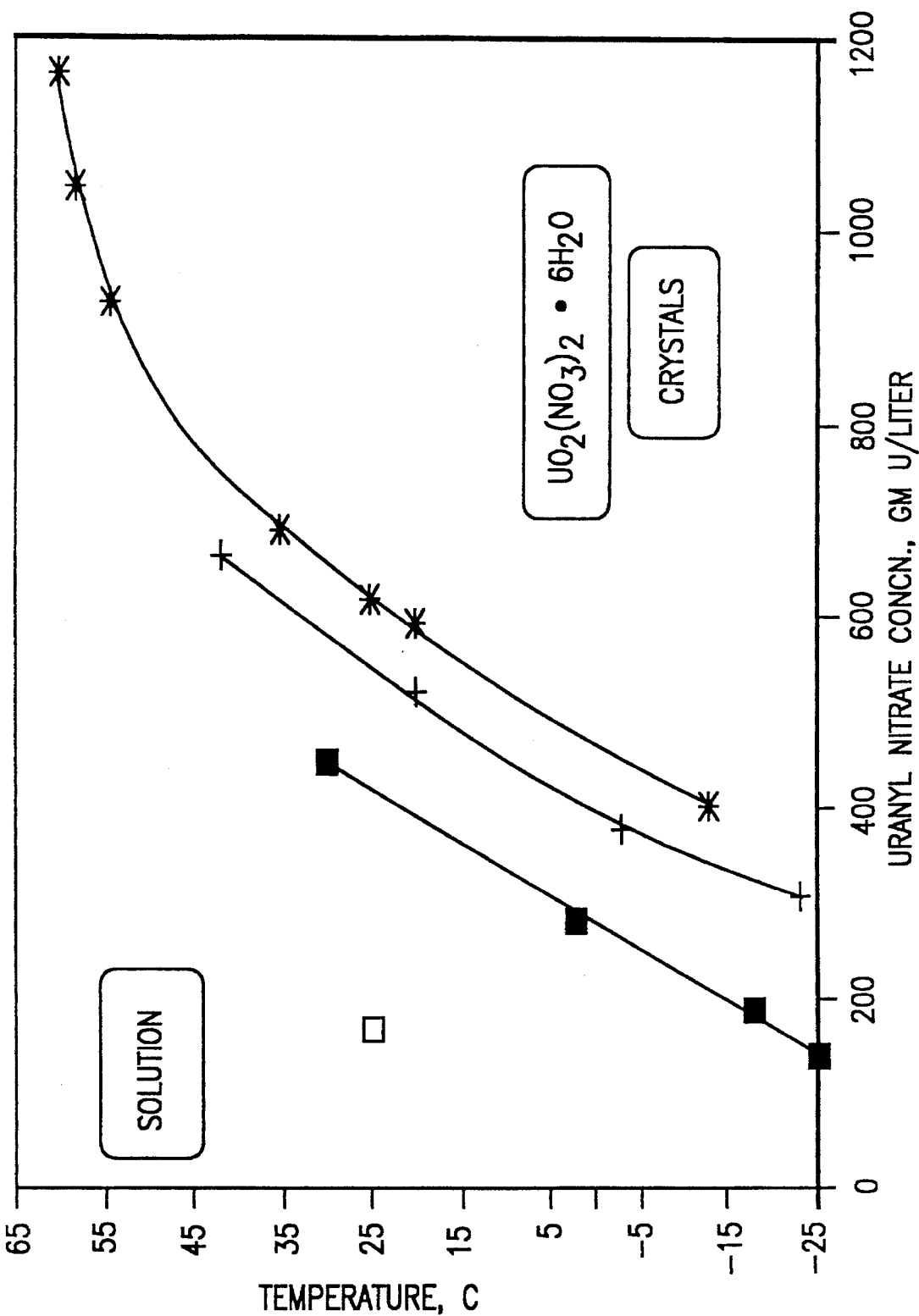
FIG. 2 is a graph of experimental data showing the solubility of uranyl nitrate as a function of temperature for nitric acid concentrations of: (□) 13, (■) 3, (+) 1 and (*) 0 N.
Figure 3:
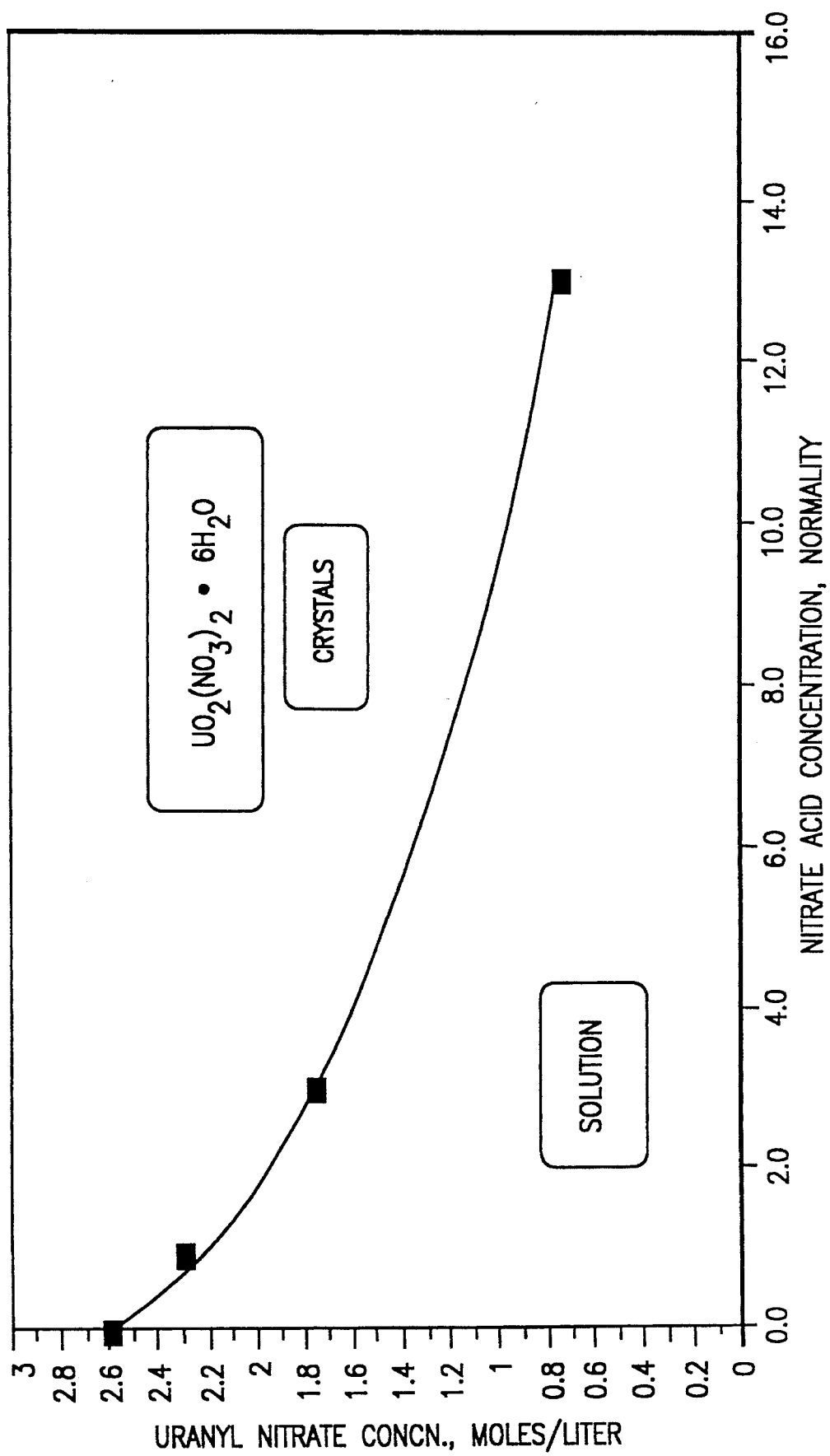
FIG. 3 is a graph of experimental data showing the solubility of uranyl nitrate as a function of nitric acid concentration at room temperature (25° C.)

The solubility of uranyl nitrate is a strong function of the nitric acid concentration of the starting solution as shown in FIG. 2. As the acid concentration increases, the solubility decreases and crystalline uranyl nitrate hexahydrate particles precipitate from solution. FIG. 3 shows the solubility of uranyl nitrate at room temperature.

Experimental data were obtained to define the important parameters for this process. The experimental results show that the following conditions are required: (1) the starting nitric acid concentration should be 2 to 3 moles/liter; (2) the molar ratio of $HNO_3$ to $U_3O_8$ should be greater than 8; and (3) boiling conditions should prevail to obtain complete conversion in the shortest time period.

The time for a complete reaction ranged from 40 to 135 minutes at boiling conditions. Increasing the starting nitric acid concentration decreased the time for complete reaction. At a starting nitric acid concentration of 3 moles/liter, a complete reaction was obtained in 40 minutes. In comparison, a period of 135 minutes was required to complete the reaction at 2 moles/liter. Reducing the temperature below the boiling point will increase the time to complete the reaction.

Figure 4:
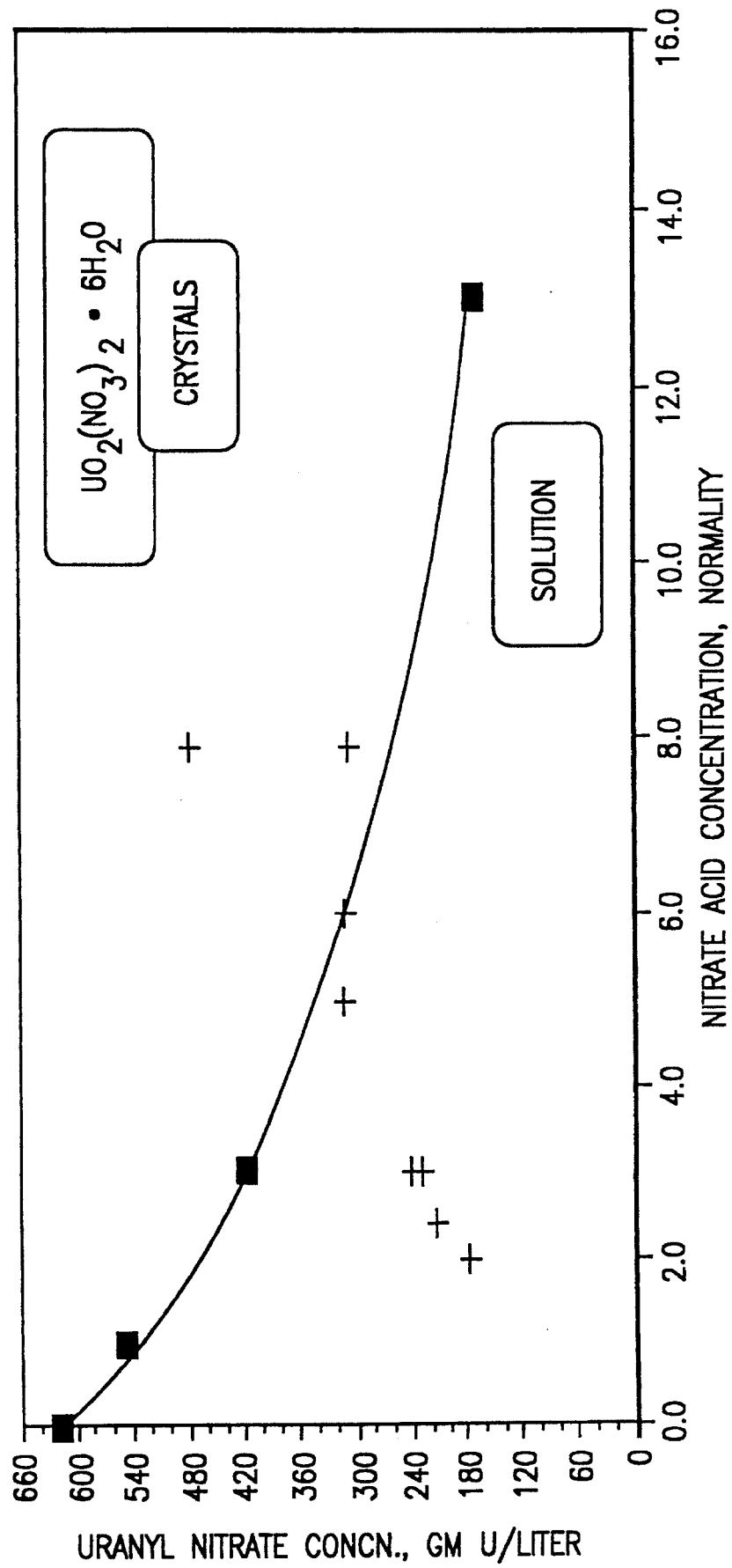
FIG. 4 is a graph of experimental data (+) superimposed on the solubility curve of FIG. 3.

FIG. 4 shows experimental data obtained the final uranyl nitrate solutions obtained from this process. The uranium concentration is in the range from 180 to 240 gm U/liter with a free acid concentration that is less than 1 mole/liter. This meets the uranyl nitrate feed requirements for ADU precipitation. Under these conditions, the uranyl nitrate concentration falls below the solubility curve. Therefore, the uranyl nitrate hexahydrate crystals are not present in the feed to the precipitation process.

The ceramic characteristics of the sintered pellets are determined by the specific surface area ($m^2/gm$) and the morphology of the $UO_2$ powder. If the specific surface area is less than 3.5 $m^2/gm$, a low sinter density, below 97.5% TD, is observed, together with pellet defects, such as end flakes, radial cracks, etc. High-specific-area powders (i.e., greater than 3.5 $m^2/gm$) yield the quality pellet of the invention, namely, a pellet having high sinter density and few defects after grinding.

The high-surface-area powder obtained from the disclosed scrap reclamation process of the invention is preferably passivated as disclosed in U.S. Pat. No. 5,069,888 to Larson et al., commonly assigned to the assignee of the present application. The subject matter of U.S. Pat. No. 5,069,888 is incorporated by reference herein.

Passivation controls the O/U ratio during powder preparation, pressing and sintering, and thereby inhibits the spontaneous and uncontrolled oxidation, or pyrophoric reaction of oxides of uranium in the powder. Control of the O/U ratio is important in achieving a high-sinter-density pellet as well as the other nearly ideal ceramic characteristics achieved by the invention. Passivation is accomplished by forming a hydrate compound on the surface of particles of uranium oxides.

The passivation process of U.S. Pat. No. 5,069,888 is a continuous method for subjecting particulate oxides of uranium to a controlled oxidation reaction system that provides an oxidation-resisting protective surface over the particles of uranium oxide. This passivating layer preserves the existing O/U ratio of thermodynamically unstable uranium oxides, whereby the uranium oxide can be further handled, stored and/or processed in air or other oxygen-containing atmospheres without significant increases in the O/U ratio.

In accordance with this passivation process, unstable oxides of uranium are continuously subjected to a controlled atmosphere containing minuscule proportions of oxygen with the balance being an inert or non-oxidizing gaseous medium, such as argon, nitrogen, carbon dioxide, carbon monoxide, methane and the like, and mixtures thereof. The oxygen content for this treatment should be in the range from about 0.3 to about 0.6 vol. % of the atmosphere. This controlled atmosphere of appropriate gaseous mixtures is continuously supplied for contacting the uranium oxides throughout the treatment preferably at a rate of 2 to 4 kg/hr of the particulate uranium oxide and approximately 1 $ft^3/min$ of the gaseous mixture.

Further, the unstable oxides of uranium, while exposed to the controlled atmosphere with the given oxygen content, are held at a temperature within the range of about 40° C. to about 250° C. The apt temperature conditions for the process are most expediently maintained by removing the thermal energy generated in the exothermic oxidation reaction with the gaseous flow supplying the controlled atmosphere. A substantially continuous flow of the oxygen-containing gas mixture passing through the system in contact with the uranium oxide will convey away unwanted heat and govern the oxidation reaction. Thus, a balance between the rate of oxidation and the rate of heat removal by gas convection is preferred. The oxides of uranium are subjected to the specified atmosphere and temperature for a time period ranging from at least about 12 minutes up to about 120 minutes.

Further, as taught in U.S. Pat. No. 5,069,888, the controlled atmosphere of inert gas mixed with the prescribed portion of oxygen is applied as a continuous stream counter-current to the particulate oxides of uranium while the uranium oxide particles are passing in a continuous flow through the length of a closed rotating reaction vessel. This technique provides effective and uniform intermingling of the gas with the particles for even reaction and removal of heat from the uranium oxide particles which terminates the oxidation reaction. The heat removal by the counter-current gas flow is designed to eliminate both the sensible heat of the particles entering the reactor unit and the heat generated by the controlled oxidation reaction and to reduce the temperature of the particles at their discharge from the reaction unit to approximately room temperature (i.e., 25° C.).

The passivating surface of hydrate formed comprises a monohydrate. i.e., uranyl hydroxide ($UO_2(OH)_2$), or a dihydrate, i.e., uranyl hydroxide hydrate ($UO_2(OH)_2.H_2O$), and typically a combination of both the monohydrate and dihydrate. The controlled surface oxidation produces a hydrate layer or coating which is 3–10 Angstroms thick.

Variations and modifications of the process parameters in accordance with the invention will be readily apparent to persons skilled in nuclear fuel fabrication. All such variations and modifications are intended to be encompassed by the appended claims.

We claim:

1. A method for fabricating high-sinter-density $UO_2$ pellets from $UO_2$ scrap material comprising the steps of:

oxidizing $UO_2$ scrap material to form $U_3O_8$ particles;

reacting said $U_3O_8$ particles with a nitric acid solution to produce a solution of uranyl nitrate;

reacting said uranyl nitrate solution with ammonium hydroxide to-form a slurry of ammonium diuranate particles by precipitation;

removing ammoniated water from said ammonium diuranate slurry to produce ammonium diuranate precipitate;

calcining the ammonium diuranate precipitate to produce $U_3O_8$;

reducing the $U_3O_8$ in a hydrogen atmosphere to form $UO_2$ powder;

passivating said $UO_2$ powder by forming a hydrate compound on the surfaces of the particles of said powder; and sintering said passivated powder to form a pellet, wherein said precipitation is carried out in first and second stages, the pH in said first stage being less than the pH in said second stage and the amount of uranium precipitated out of said uranyl nitrate solution during said first stage of precipitation being held to no more than 67%, and said uranyl nitrate solution is reacted with ammonium hydroxide by adding ammonia in an amount determined in accordance with the following:

Uranyl Nitrate Flow $(UNH) = 14.59\ (R/C_u)$

Ammonia Flow $(NH_3) = (UNH)(2C_u P/238 + N)$

Water Flow $= (NH_3)\ (M_2/M_1 - 1)$ where R is the rate of $UO_2$ (kg/hr); $C_u$ is the uranium concentration (gm U/liter); N is the nitric acid molarity; P is the fraction of uranium precipitated in the first stage of precipitation; and $M_1$, $M_2$ are the dilute and concentrated $NH_3$ molarities, respectively.

2. The method as defined in claim 1, wherein the amount of uranium precipitated out of said uranyl nitrate solution during said first stage of precipitation is held to 65±2%.

3. The method as defined in claim 1, wherein the remainder of the uranium is precipitated out of said uranyl nitrate solution during said second stage of precipitation.

4. The method as defined in claim 1, wherein said uranyl nitrate solution has a uranium concentration of 180 to 240 gm U/liter and a free acid concentration less than 1 mole/liter.

5. The method as defined in claim 1, wherein said nitric acid solution has a nitric acid concentration in the range of 2 to 3 moles/liter.

6. The method as defined in claim 1, wherein the molar ratio of nitric acid to $U_3O_8$ is not greater than 8.

7. The method as defined in claim 1, wherein said precipitation is carried out under boiling conditions.

* * * * *